(12) United States Patent
Thiel

(10) Patent No.: US 8,767,755 B2
(45) Date of Patent: Jul. 1, 2014

(54) SYNCHRONOUS NETWORK SWITCH

(75) Inventor: Christian Thiel, Oberaudorf (DE)

(73) Assignee: SMSC Europe GmbH, Karlsruhe (DE)

( * ) Notice: Subject to any disclaimer, the term of this patent is extended or adjusted under 35 U.S.C. 154(b) by 82 days.

(21) Appl. No.: 13/486,672

(22) Filed: Jun. 1, 2012

(65) Prior Publication Data

US 2012/0307834 A1 Dec. 6, 2012

(30) Foreign Application Priority Data

Jun. 3, 2011 (EP) ..................................... 11168633

(51) Int. Cl.
*H04L 12/28* (2006.01)
(52) U.S. Cl.
USPC ........................................................ 370/401
(58) Field of Classification Search
CPC combination set(s) only.
See application file for complete search history.

(56) References Cited

U.S. PATENT DOCUMENTS

| 8,270,397 B2 * | 9/2012 | Berman .................... 370/355 |
| 2005/0271068 A1 | 12/2005 | Hetzel et al. |
| 2007/0242670 A1 * | 10/2007 | Simonson et al. ............ 370/390 |
| 2008/0002732 A1 | 1/2008 | Tzeng et al. |
| 2008/0008202 A1 * | 1/2008 | Terrell et al. .................. 370/401 |

* cited by examiner

*Primary Examiner* — Clemence Han
(74) *Attorney, Agent, or Firm* — Kevin L. Daffer; Daffer McDaniel LLP

(57) ABSTRACT

A network router connects network nodes within a ring network for transferring frames of data within the network. The network router has a plurality of network ports which provide a physical interface to the network nodes. The network router further has a routing processor which is connected to the network ports. The routing processor is configured for receiving frames and transmitting frames at the same time. It reads a specific payload section from a received frame and places the data read from the specific payload section within another specific payload section of a frame to be transmitted.

15 Claims, 4 Drawing Sheets

| | 121 | 122 | 123 | 124 | |
|---|---|---|---|---|---|
| 60: | --- | --- | --- | --- | 20 |
| 61: | 131 | 133 | --- | --- | |
| 62: | 131 | --- | --- | --- | 30 |
| 63: | 134 | --- | --- | --- | |
| 64: | --- | 133 | --- | --- | 40 |
| 65: | 132 | (133) | --- | --- | |
| 66: | 132 | 134 | --- | --- | 50 |
| 67: | (132) | (134) | --- | --- | |

|     | 121 | 122 | 123 | 124 | 125 | 126 | 127 | 128 |
|-----|-----|-----|-----|-----|-----|-----|-----|-----|
| 60: | --- | --- | --- | --- | --- | --- | 136 | --- |
| 61: | 131 | 133 | --- | --- | --- | 136 | --- | --- |
| 62: | --- | 131 | --- | --- | --- | --- | --- | --- |
| 63: | 134 | --- | --- | 135 | --- | --- | --- | --- |
| 64: | --- | --- | 133 | --- | --- | --- | --- | --- |
| 65: | 132 | --- | --- | --- | --- | --- | --- | --- |
| 66: | --- | 134 | 132 | --- | 135 | --- | --- | --- |
| 67: | --- | --- | --- | --- | --- | --- | --- | --- |

Rows 60–61: 20; Rows 62–63: 30; Rows 64–65: 40; Rows 66–67: 50

SYNCHRONOUS NETWORK SWITCH

PRIORITY CLAIM

This application claims priority to pending European Application No. 11168633.3 filed on Jun. 3, 2011.

BACKGROUND OF THE INVENTION

1. Field of the Invention

This invention relates to a communication system and, more particularly, to a synchronous communication system formed as a ring network of two or more ports coupled to one another. The ports are preferably associated with a single multimedia device, and the network is formed between ports of the device to which the external multimedia device is coupled.

2. Description of Relevant Art

A communication system is generally known as a system that permits communication between nodes interconnected by a transmission line. Each node can transmit information, and/or can receive information, across the transmission line. The communication system of interconnected nodes can be organized in various topologies, such as bus, ring, star, or tree topology.

A bus topology network is generally regarded as linear, where transmissions from one node propagate the length of the transmission line and are received by all other nodes connected to that bus. A ring topology network, however, generally consists of a series of nodes connected to one another by unidirectional transmission links to form a single, closed loop. Examples of a ring network are described in IEEE 802.5 and Fiber Distributed Data Interface (FDDI).

Streaming data as used to transfer audio and video data has a temporal relationship between samples produced from a source port onto the network. The relationship between those samples must be maintained across the transmission line to prevent perceptible errors, such as gaps or altered frequencies. A loss in the temporal relationship can cause a receiver at a destination to experience jitter, echo, or in the worst instance, periodic blanks in the audio and video stream. A network that forwards streaming data is preferably synchronous, with each source and destination node sampling at a rate synchronous to the network.

While streaming data is typically sent synchronously across a network, there may be instances in which the sample rate local to a node is not at the same frequency as the frame synchronization rate of the transmission line. If this is the case, then the data streaming from a source device can be sample rate converted, and then sent synchronously across the network. Alternatively, the data can be sent isochronously across the network. There are different types of isochronous data streams. First, the sampling rate may not be synchronized to the network frame rate. Here the number of bytes per frame may vary slightly from frame to frame. An example of this is a 44.1 kHz audio stream transported by a 48 kHz frame rate. A second type of isochronous data streams may be a bursty signal with varying data volumes at constant time intervals. Such signal may be MPEG transport streams. In a third type of isochronous data, there may be varying data volumes at varying time intervals.

To connect a plurality of network nodes to a ring network, a hub as disclosed in US Publication No. 2005/0271068 may be used. However, a problem with the disclosed hub is that it does not reduce the network load as it only forwards the received data. A router is required to decrease network load and increase network throughput.

A router for Ethernet is disclosed in US Publication No. 2008/0002732. The drawback of such a router is that it requires increasing amounts of buffer memory and processing power with increasing network connections and data throughput. Due to buffering, a synchronous real-time transmission of data is not possible.

For transferring streaming multimedia data, like audio and video data, over non-deterministic networks like Ethernet, QoS (Quality of Service) mechanisms are implemented. These require further processing capabilities and excessive memory for buffering of lower priority frames. This can hardly be integrated into a microcontroller.

SUMMARY OF THE INVENTION

The problem to be solved by the invention is to provide a network router for a ring network which requires low computing resources and low memory and is further capable of routing synchronous real-time data.

Solutions of the problem are described in the independent claims. The dependent claims relate to further improvements of the invention.

A network router is configured for connecting network nodes within a ring network. A network node sending data on the network is referred to herein as a source, while a network node receiving data from the network is referred to herein as a sink. Network nodes may be configured to operate as a source and/or a sink. In the ring network described herein, frames of data are transferred, wherein each frame comprises a plurality of payload sections in a first time slot. These frames preferably transport synchronous data, like audio or video data, but may also transport isochronous data. The network router has a plurality of network ports which provide a physical interface to a plurality of network nodes, and a routing processor which is connected to the network ports. Preferably, at least one of the network ports is connected to a ring shaped sub-network.

The routing processor is configured to receive a frame, to modify the frame and to transmit the modified frame at basically the same time when receiving the frame. The phrase "basically the same time" means herein that transmission of the frame starts at the latest before reception of the frame has been terminated. Preferably, transmission of the frame starts with a delay of a maximum of 100 bytes, and more preferably, a maximum of 10 bytes after the start of reception.

The routing processor is further configured to read at least one of the payload sections of the frame received by the routing processor, and to place the data read from the at least one of these payload sections within a payload section within the modified frame.

Preferably, payload sections are routed via the network ports to subnets having network nodes which need to receive the payload sections. For example, a first frame may be received by any network port. The port that receives the first frame may read data from at least one payload section of the plurality of payload sections included in the first frame. For example, data read from a first payload section of the first frame may be placed in a second frame which may be transmitted via a first network port. Furthermore, a third frame may be transmitted via a second network port, with the third frame containing data read from a second payload section of the plurality of payload sections read from the first frame. Most preferably, the data read from first payload section may be different from the data read from the second payload section.

The advantage of this router is its simplicity and the capability of fully using the available network bandwidth while requiring only low amounts of buffer memory and processing power. Preferably, the plurality of payload sections of the first frame contains synchronous data.

In one preferred embodiment, the plurality of network ports are an integral part of the routing processor. This means that the network router may be implemented on a single chip, preferably on a specialized microcontroller or an ASIC.

In another preferred embodiment, the routing processor is distributed over the plurality of network ports. This means that the network ports communicate with each other to exchange routing information and forward the data accordingly between individual network ports.

According to another embodiment, the routing processor may comprise a routing table which stores a payload section of a received frame and a corresponding payload section of a transmitted frame.

It is further preferred, that at least two of the network nodes, and preferably all of the network nodes transmit frames synchronously. Accordingly, the transmission of frames starts at the same time or with a pre-determined or deterministic delay to each other while the frame clocks are synchronous. This delay is smaller and preferably significantly smaller than the length of a frame.

In a further embodiment, at least one network node is connected to at least one network router.

Another embodiment is a method for routing of data within a ring network. The method includes the steps of:
  receiving at least a frame of the data from the network,
  generating at least one modified frame of data by reading at least one specific payload section of the received frame, and placing at least one of these read payload sections within at least one another payload section within the at least one modified frame, and
  transmitting the at least one modified frame of data to the network at basically the same time when receiving the frame.

The method may further be improved by transmitting the at least one modified frame of data to a first subnet and further including the steps of:
  generating at least one further modified frame of data by reading at least one different payload section of the received frame, and placing at least one of these read payload sections within at least one another specific payload section within the at least one further modified frame, and
  transmitting the at least one further modified frame of data to a second subnet of the network at basically the same time when receiving the frame.

In a preferred embodiment of the method, the at least one specific payload section of the received frame contains synchronous and/or isochronous data. As a consequence, the modified frame also contains synchronous and/or isochronous data.

BRIEF DESCRIPTION OF THE DRAWINGS

In the following, the invention will be described by way of example, without limitation of the general inventive concept, on examples of embodiment and with reference to the drawings.

Figure 1:
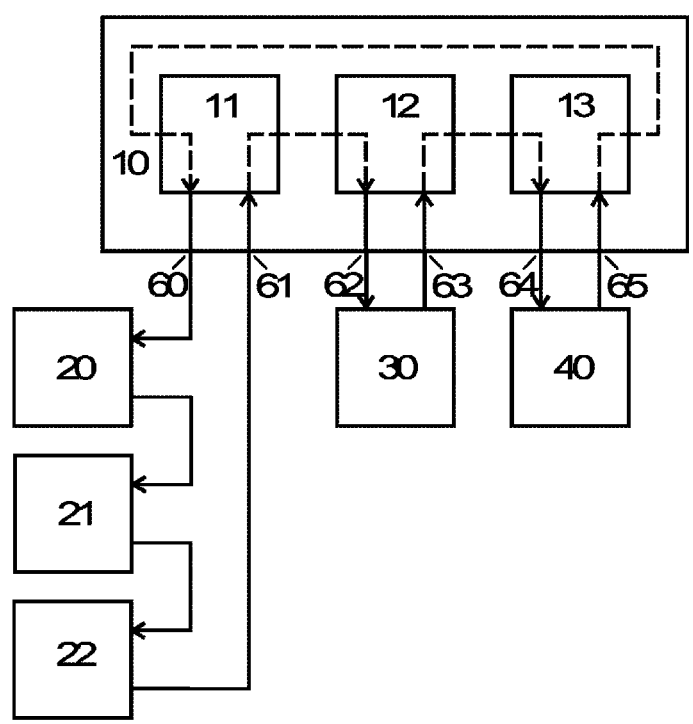
FIG. 1 shows a network with network nodes connected to a router.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a preferred embodiment of a network is shown. A plurality of network nodes is connected by a network router 10 to form a ring shaped network. The network may be MOST bus. The network router 10 has three network ports 11, 12, 13. Network port 11 forwards data via line 60 to a first node 20. This node forms a sub-ring with nodes 21 and 22 forwarding data through these nodes. The output of the last node 22 is connected by line 61 to the input of network port 11. The output of network port 12 is connected for forwarding data to the input of network node 30 via line 62, while the output of this network node is connected for forwarding data by line 63 to network port 12. Furthermore, the output of network port 13 is connected for forwarding data to the input of network node 40 via line 64, while the output of this network node is connected for forwarding data by line 65 to network port 13. Within the network router 10 the individual network ports 11, 12 and 13 may be connected as shown by the dashed lines to close a logic ring of the ring network. In this example, network data received via line 61 by network port 11 is forwarded to network port 12 for transmission over line 62. Data received by line 63 is forwarded from network port 12 to network port 13 for transmission by line 64. Finally, data received from line 65 by network port 13 is forwarded to network port 11 for transmission over line 60.

It is obvious that there may be other ways of connecting the individual network ports. This is only a simplified diagram of the basic data flow. Due to the routing functionality of network router 10, parts of data frames sent over the network may be routed differently, e.g., directly between any two ports. The data flow within the network router is not necessarily directed via physical lines as shown. It may also be a logic data flow which may be managed by a microcontroller or microprocessor. Due to the deterministic network, routing can be kept very simple.

Figure 2:
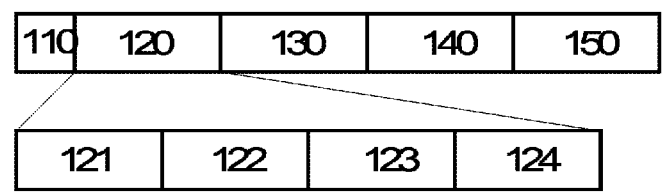
FIG. 2 shows an exemplary data frame which may be transmitted over the network.

FIG. 2 shows an exemplary data frame which may be transmitted over the network shown in FIG. 1. After a frame header 110 follow individual time slots dedicated to specific types of data. The first time slot 120 may be dedicated to synchronous data, a second time slot 130 may be dedicated to packetized data, a third time slot 140 may be dedicated to isochronous data and the fourth time slot 150 may be dedicated to control data. All time slots may have different sizes. As the routing according to the invention is most efficient for synchronous and isochronous data, such routing of synchronous data is specifically explained in the following exemplary embodiments. It is obvious that besides synchronous data also generally any other type of data may be routed accordingly. The time slot 120 which is dedicated to synchronous data may further be subdivided into a plurality of payload sections, each payload section being assigned to a specific communication channel. Herein the term "communication channel" is used for a communication between at least two network nodes. It preferably refers to a communication persisting for a specific time, but it may also be used for an individual package or a plurality of packages of data transmitted between network nodes. Such a communication may be a unicast communication between one transmitter and one receiver, a multicast communication between one transmitter and a plurality of receivers, or even a broadcast communication from one transmitter to all receivers. In the embodiments shown herein, time slot 120 is subdivided into four payload sections 121, 122, 123 and 124.

Figures 3, 4:
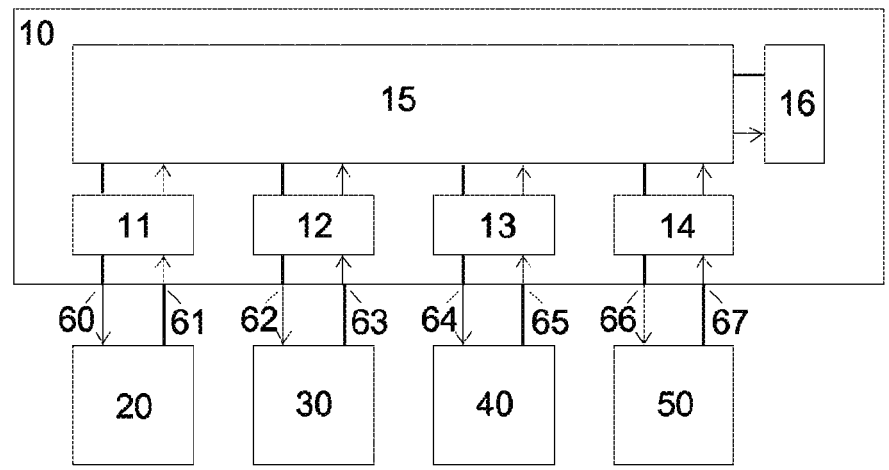
FIG. 3 shows a network router connected to network nodes.
FIG. 4 shows the function of the routing processor.

FIG. 3 shows network router 10 connected to network nodes 20, 30, 40 and 50. This configuration is similar to FIG. 1. Now instead of the 3 network nodes 20, 21 and 22 only one network node 20 is shown. Another network node 50 is attached to network port 14 of network router 10 by lines 66 and 67. Furthermore, the network ports 11, 12, 13 and 14 are connected to a routing processor 15. The network lines 60-67 preferably are optical lines. They may also be electrical lines.

An allocation manager (16) forwards local payload allocation information to the network nodes (20, 30, 40, 50). For this purpose it is connected to the network. Such a connection may also be achieved by the routing processor 15. The allocation manager (16) may also be part of the routing processor 15. It may also be an independent network node or part of any other network node, preferably of a master node. The allocation manager preferably forwards allocation information locally to individual nodes (20, 30, 40, 50) or to all nodes (20, 21, 22) of a sub-ring. The allocation information may be contained within each frame. Preferably, the allocation information is only sent when allocation changes and/or during predetermined time intervals and/or upon request of a network node. For transmission of allocation information, preferably signaling bytes in a frame, preferably in a frame header, are used. The allocation information preferably contains information on the relationship between communication channels and the assigned sections of time slots. It also may contain information about the sink and source nodes. The allocation manager may store the individual allocation information for the nodes. It may also store a master allocation table containing all allocation information of the network. In another embodiment, the allocation manager may modify the allocation information that a bus master sends to the network nodes. This may be necessary as, in most cases, a bus master has knowledge of all network nodes, but not necessarily of a quick network router and its capabilities. As a network with a network router may serve a higher number of network connections than the number of available payload sections, the bus master may be configured to assume a specific number of virtual payload sections and virtually assign individual network connections, each having at least a data source and a data sink bound to one of these virtual payload sections. When the bus master sends this allocation information to the individual bus nodes, it is modified by the allocation manager and translated to the physical available number of payload sections. This maintains compatibility with older network equipment.

In FIG. 4, the function of the routing processor 15 and a method of routing are explained in more detail. In each line, the first number refers to one of the transmission lines 60 to 67. The following four blocks refer to the contents of data of the four payload sections 121, 122, 123 and 124 (from left to right) of the time slot 120 for synchronous data. In this embodiment there are four communication channels from a source to a sink:

1. network node 20 to network node 30 transmitting data 131
2. network node 40 to network node 50 transmitting data 132
3. network node 20 to network node 40 transmitting data 133
4. network node 30 to network node 50 transmitting data 134

A data frame being transmitted by network port 11 through line 60 to network node 20 has four empty payload sections as there are no data to be transmitted to network node 20. Network node 20 sends, via line 61, data 131 in the first payload section 121 which shall be forwarded to network node 30 via line 62. Furthermore, network node 20 sends data 133 in the second payload section 122 which shall be forwarded to network node 40 via line 64. After processing of the frame by the routing processor 15, a modified frame is transmitted via line 62 to network node 30. This modified frame only contains data 131 in payload section 121 which shall be received by network node 30. This network node 30 further writes data 134 into payload section 121, which shall be forwarded to network node 50. Here, payload section 121 is double used since the incoming data 131 is from a different communication channel than the outgoing data 134. Without the router 10, such a configuration is only possible, if the receiver for a specific communication channel follows its transmitter in the ring. This is still valid for sub-rings (20, 21, 22) without a switch. Due to the switch, the payload sections may be freely assigned. When forwarding the frame received by line 63 from network node 30, the routing processor 15 places data 133 into payload section 122 to be forwarded to network node 40 via line 64. This data 133 has previously been received via line 61 from network node 20. Network node 40 further adds data 132 into payload section 121 which shall be forwarded to network node 50, and transfers them via line 65 to the network router 10. It may optionally discard or mark as invalid data within payload section 122. The routing processor 15 forwards the frame via line 66 to network node 50 by leaving payload section 121 unmodified and by adding data 134 into payload section 122 as previously received in payload section 121 from network node 30. Network node 50 receives the data and may optionally discard or mark as invalid data within payload sections 121 and 122. Finally, the frame received by network router 10 from network node 50 via line 67 is forwarded via line 60 to network node 20. In this embodiment, data is always kept in the same payload section of the frame. For example, at line 61, data 133 is assigned to payload section 122. After routing to line 64, the location remains unchanged within payload section 122. This ensures compatibility with standard network nodes. For a more efficient usage of the payload sections the location of data may be reassigned to a different location. For example, data 133 may be assigned to payload section 121 at line 64. Before doing such a reassignment, the network nodes must be informed about such a reassignment or reconfigured to handle such reassigned locations. For the case there is a subring connected to a network port, e.g. as shown in FIG. 1, the first network port 11 may forward data received by line 61 to line 60, if the source is behind the sink in the chain. This may be the case if network node 22 is forwarding data to network node 20. For the case the source is in the network before the sink, the router may discard received data. This may be the case if network node 20 is forwarding data to network node 21.

This example shows efficiency of routing done by the routing processor 15 within the network router 10. For four communication channels, only two payload sections of the time slot dedicated to synchronous data are required. Without routing, four payload sections of the time slot would be required as each of data 131, 132, 133, 134 has to be assigned to one of payload sections 121, 122, 123, 124. This very simple and efficient routing requires far less memory and processing power compared to routing known from prior art.

Figures 5, 6:
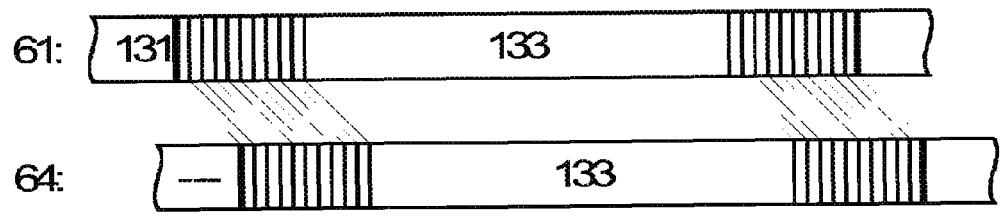
FIG. 5 shows the timing relationship between data transmitted over the network at individual lines.
FIG. 6 shows more routing functions in detail.

FIG. 5 shows the timing relationship between data transmitted over the network at individual lines 61 and 64 connected to individual network nodes 20 and 40 for transfer of data 133. The propagation of the frame from line 61 to 64 causes a delay which is typically in a range of nanoseconds to microseconds. In this example, there is a delay of 5 bits which may be equal to 40 ns at a bit rate of 125 Mb per second. Accordingly, the frame at line 64 is delayed over line 61 for the duration of 5 bits. For assembling the frame to be transmitted on line 64, the router receives the frame from line 63 and inserts data 133 into payload section 122. The data 133 are continuously received from line 61 and must be delayed for the duration of 5 bits before insertion into the frame of line 64. In this diagram, only the first and last few bits of payload section 133 are shown. The router only requires a minimum of memory to compensate for the delays within the network. In this example, a memory of 5 bits is required. This is negligible compared to the memory requirement of conventional routers like Ethernet routers which have to receive and store at least one frame before forwarding the frame over the network. Such a standard Ethernet frame would require a memory of 1542 bytes.

FIG. 6 shows more routing functions in detail. In an alternative embodiment, at least two network ports and, preferably all network ports, start transmitting their frames at the same time or with a deterministic delay to each other. As shown above, data from attached network nodes is received with some delay, so that data received from one node cannot be inserted into the payload section being transmitted to a different node at the same time. Instead, it must be delayed for the next payload section. For example, received data 131, 133 and 134 are transmitted one payload section later. Data 132 received by line 65 in payload section 121 cannot be transmitted by line 66 in payload section 122 as this is already occupied by data 134. Therefore, data 132 must be further delayed until payload section 123. Data 135 received by line 63 in payload section 124 cannot be transmitted in time slot 120 as the payload section 124 is the last one in this time slot. Therefore, data 135 must be delayed further. In this example, data 135 is delayed for transmission by line 66 until the first available payload section 125 in the next frame. For the case node 20 is included within a sub-ring along with several other nodes 21, 22, as shown in FIG. 1, transmitting data from a node in the sub-ring to another node in the sub-ring located in front of this node would require retransmission of data into the same sub-ring. This is shown by example of data 136 which may be transmitted by node 22 to node 21. Data is fed into line 61 using payload section 126 and is retransmitted into the same sub-ring by using payload section 127 at line 60. This is forwarded via node 20 to destination node 21.

In general, there may be a delay to deliver data in a later payload section (121, 122, 123, 124), in a later time slot (120, 130, 140, 150) or even a later frame.

Figure 7:
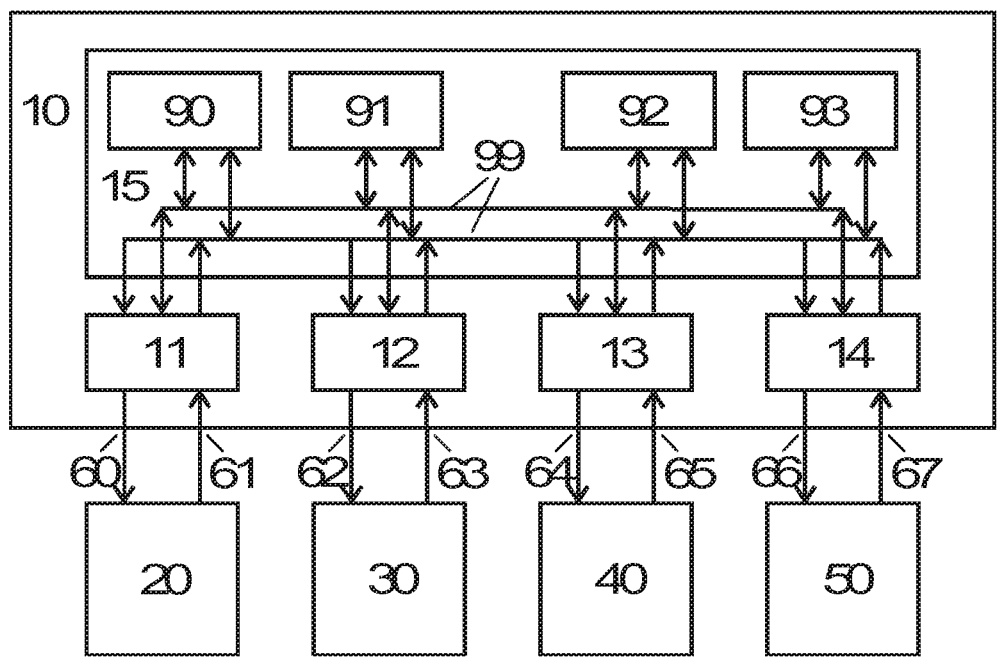
FIG. 7 shows the internal structure of network router in more detail.

FIG. 7 shows the internal structure of network router 10 in more detail. The routing processor 15 has a microcontroller 90 and a memory 91. Both are connected with the other components of the router like the network ports 11, 12, 13 and 14 by a bus 99. This bus has at least one line for control signals (shown as upper line) which are sent by the microcontroller 90 to the network ports. There may be at least one additional line (lower line) for forwarding data frames between the network ports. There may be also a network node 92 embedded within the network router. This network node 92 is logically integrated into the ring structure thus receiving data frames and transmitting data frames. It may be used as a timing master defining the timing reference for the whole bus system. It may also be used as a configuration master sending configuration information to individual network nodes. It may further forward allocation information to network nodes, for example, for specifying which of payload sections 121, 122, 123, 124 is assigned to a specific communication channel as described above. It may also reconfigure attached network nodes. The routing processor may also be provided with an additional network port/controller 93 to communicate with other networks, even having different network standards or protocols like Ethernet or MediaLB. The network may also have local sub-networks on the same electronic device or even on the same chip.

It will be appreciated to those skilled in the art having the benefit of this disclosure that this invention is believed to provide network routers, network components and networks for transfer of data. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A network router for connecting network nodes within a ring network for transferring frames of data comprising:
   a plurality of network ports comprising at least a first network port and a second network port, which provide a physical interface to at least two of the network nodes, wherein the first network port is connected to a first ring shaped sub-network, and wherein the second network port is connected to a second ring shaped sub-network; and
   a routing processor connected to the plurality of network ports, wherein the routing processor is configured for:
      receiving a first frame via one of the plurality of network ports, wherein the first frame comprises a plurality of payload sections in a first time slot;
      reading data of at least one of the plurality of payload sections included within the first frame;
      placing the data read from a first one of the plurality of the payload sections within a second frame and transmitting the second frame via the first network port;
      placing the data read from a second one of the plurality of the payload sections within a third frame and transmitting the third frame via the second network port; and
      wherein the data read from the first one of the plurality of the payload sections is different from the data read from the second one of the plurality of the payload sections.

2. The network router according to claim 1, further comprising an allocation manager for forwarding local payload allocation information to the at least two of the network nodes.

3. The network router according to claim 2, wherein the allocation manager modifies allocation information from a bus master.

4. The network router according to claim 1, wherein the plurality of payload sections of the first frame contains synchronous and/or isochronous data.

5. The network router according to claim 1, wherein the plurality of network ports are an integral part of the routing processor.

6. The network router according to claim 1, wherein the routing processor is distributed over the plurality of network ports.

7. The network router according to claim 1, wherein the routing processor comprises a routing table which stores a payload section of a received frame received and a corresponding payload section of a transmitted frame.

8. The network router according to a claim 1, wherein at least two of the plurality of network ports transmit frames synchronously or with a predetermined or deterministic time relation to each other.

9. The network router according to claim 8, wherein all of the plurality of network ports transmit frames synchronously.

10. The network router according to claim 1, wherein the routing processor delays at least one of the data read from the plurality of payload sections until a later payload section, a later time slot or a later frame.

11. A ring network having at least one network router for connecting network nodes and transferring frames of data, the at least one network router comprising:

a plurality of network ports comprising at least a first network port and a second network port, which provide a physical interface to at least two of the network nodes, wherein the first network port is connected to a first ring shaped sub-network, and wherein the second network port is connected to a second ring shaped sub-network; and a routing processor connected to the plurality of network ports, wherein the routing processor is configured for:

receiving a first frame via one of the plurality of network ports, wherein the first frame comprises a plurality of payload sections in a first time slot;

reading data of at least one of the plurality of payload sections included within the first frame;

placing the data read from a first one of the plurality of payload sections within a second frame and transmitting the second frame via the first network port;

placing the data read from a second one of the plurality of payload sections within a third frame and transmitting the third frame via the second network port;

wherein the data read from the first one of the plurality of the payload sections is different from the data read from the second one of the plurality of the payload sections; and wherein at least one of the network nodes is connected to the at least one network router.

12. A method for routing of data within a ring network comprising the steps of:

receiving a frame of the data from the ring network;

generating a modified frame of data by reading at least one specific payload section of the frame received, and placing at least one of these read payload sections within at least one another payload section of the modified frame; and transmitting the modified frame of data to the network at the same time when receiving the frame.

13. The method for routing of data according to claim 12, further comprising:

transmitting the modified frame of data to a first subnet;

generating a further modified frame of data by reading at least one different payload section of the frame received, and placing at least one of these different payload sections within at least one another specific payload section within the further modified frame; and transmitting the further modified frame of data to a second subnet of the network at the same time when receiving the frame.

14. The method for routing of data according to claim 12, wherein the at least one specific payload section of the frame received contains synchronous and/or isochronous data.

15. The method for routing of data according to claim 12, wherein the at least one of these different payload sections is delayed until a later payload section, a later time slot or a later frame.

* * * * *